United States Patent [19]

Kreher et al.

[11] Patent Number: 4,807,819

[45] Date of Patent: Feb. 28, 1989

[54] PROCESS AND APPARATUS FOR GRANULATING POWDERY MATERIALS

[75] Inventors: Alfons Kreher, Frankfurt; Werner Nagel, Alzenau; Bernd Brandt, Swisttal; Albert Peters, Erftstadt, all of Fed. Rep. of Germany

[73] Assignee: Degussa Aktiengesellschaft, Frankfurt am Main, Fed. Rep. of Germany

[21] Appl. No.: 102,819

[22] Filed: Sep. 22, 1987

Related U.S. Application Data

[62] Continuation of Ser. No. 770,981, Aug. 30, 1985.

[30] Foreign Application Priority Data

Aug. 30, 1984 [DE] Fed. Rep. of Germany ....... 3431865

[51] Int. Cl.⁴ .............................................. B02C 4/30
[52] U.S. Cl. .................................... 241/222; 241/228
[58] Field of Search ............. 741/222, 98, 228, 101 B, 741/230, 234; 425/85, 224, 363

[56] References Cited

U.S. PATENT DOCUMENTS

| | | | |
|---|---|---|---|
| 3,738,785 | 6/1973 | Reinhardt et al. | 425/85 |
| 4,017,241 | 4/1977 | Papinchak et al. | 425/363 X |
| 4,256,448 | 3/1981 | Carle | 425/327 X |
| 4,304,539 | 12/1981 | Hagiwara et al. | 425/327 X |
| 4,467,969 | 8/1984 | Godfrey et al. | 241/101 B |

Primary Examiner—Timothy V. Eley
Attorney, Agent, or Firm—Cushman, Darby & Cushman

[57] ABSTRACT

Finely divided powdery materials such as, e.g., precipitated silica are granulated by means of two rolls, one of which has a filter surface and the other has a profiled covering, in which the shafts of these rolls are arranged vertically one above the other and the finely divided powdery material is introduced into the gap between the rolls by means of at least one feed screw.

5 Claims, 1 Drawing Sheet

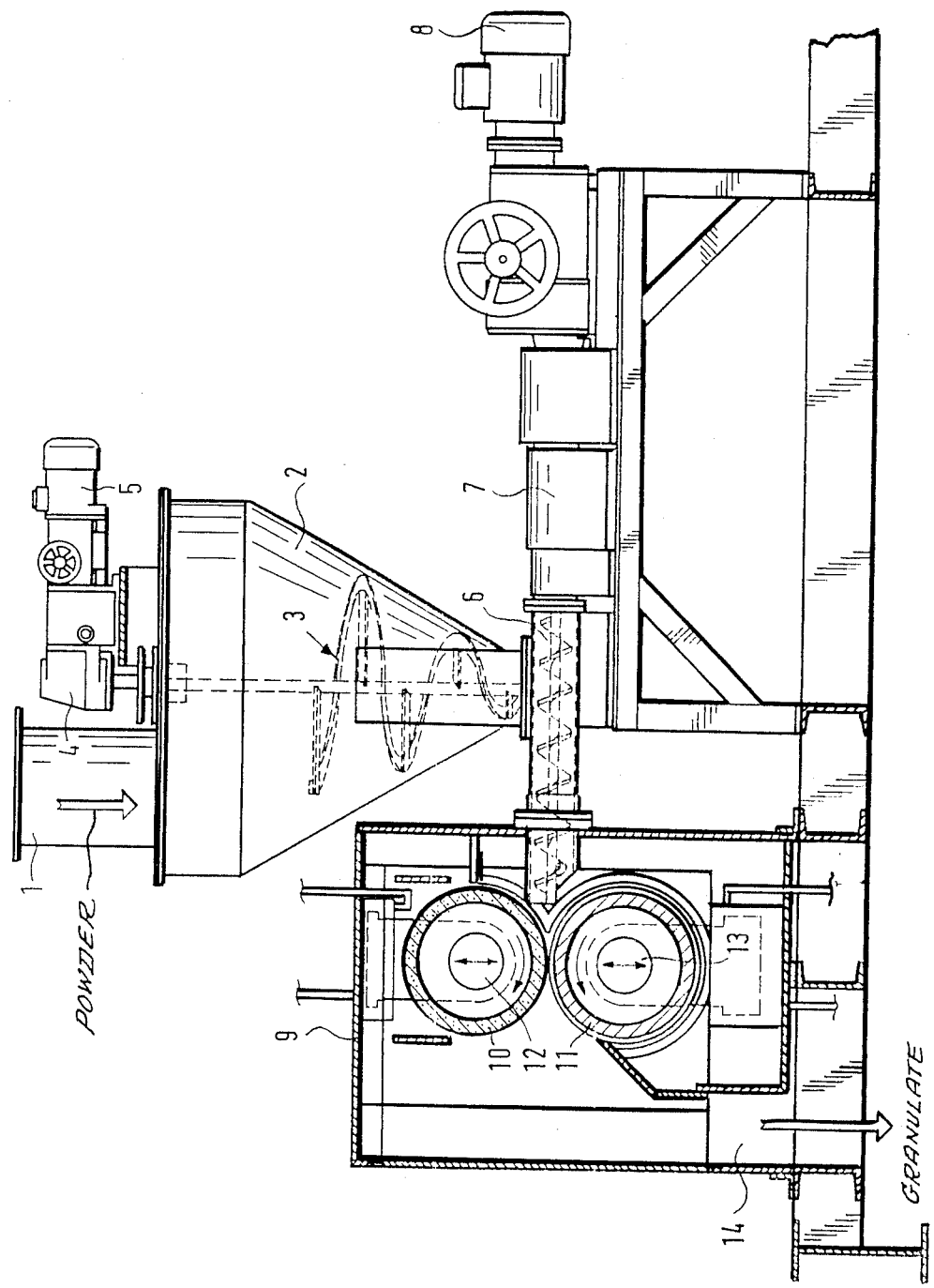

PROCESS AND APPARATUS FOR GRANULATING POWDERY MATERIALS

This is a continuation of application Ser. No. 770,981, filed Aug. 30, 1985, now abandoned.

BACKGROUND OF THE INVENTION

It is known to granulate powdery materials such as, e.g. precipitated silica by simultaneously deaerating, compressing and shaping the material. The apparatus used for this purpose consists of a gas porous filter roll arranged in a housing and connected to a suction device and a second roll in the housing arranged parallel to it and running counter to it. The second roll, having a selected profile is mounted with the first roll with a means for exerting a pressure holding the rolls together with the pressure maintained constant through a controllable pressure producer such as disclosed in German Pat. No. 1807714, and related Reinhardt U.S. Pat. No. 3,738,785. The entire disclosure of Reinhardt is hereby incorporated by reference and relied upon.

The known process has the disadvantage that any increase in output is limited. Another disadvantage is that the fluctuating bulk densities of the powders being granulated change the granulating output because the introduction of powder is only carried out via self-suction.

The problem of the present invention is to find how to increase the capacity of the known apparatus beyond that presently obtainable.

SUMMARY OF THE INVENTION

The invention provides a process for continuously deaerating and compressing as well as simultaneously shaping finely divided powdery materials, especially precipitated silica, into compacts by using a vacuum and mechanical pressure on rotating rolls whereby the finely divided powdery material is deaerated and compressed on one of the rotating filter rolls and at least partially in it to form a roll coating with the aid of a gas suction emanating from its porous jacket and this deaerated and compressed powder is further compressed by means of a second counter running roll acting on the powder. The deaerated and compressed finely divided powdery material, in a given case, after removing some material to achieve uniform thickness, is compressed to at least half its volume by means of the second counter running filter roll acting on it with uniform pressure or a roll having a sealed (closed) socket and is shaped to compact form with a specific compressive strength by a profile disposed on at least one of the rolls.

Depending upon profiling, compacted blanks of certain configuration are obtained, for instance granules, little rods, tabletts and the like for instance, if the profile is half-moon shaped, then the compacted blanks will be similarly configurated. This profiling is known in the aforementioned U.S. Pat. No. 3,738,785. The process includes introducing the finely divided, powdery material into the gap between the rolls by means of at least one feed screw, whereby one roll is arranged in such relation to the other that their shafts lies vertically one over the other.

A further object of the invention is the development of an apparatus for carrying out the process just described and comprising a filter roll disposed in a housing and connected to a suction device and a second roll in the housing arranged parallel to the first roll and running counter to it and having a porous or sealed (closed) socket whereby the distance between the jacket surface of the porous rolls turned away from the pag between the rolls and the housing walls is substantially e.g., at least three times greater than the gap between the rolls, whereby there are arranged a profile located on at least one of the rolls, which profile determines the shape of the compact. By profile is meant a selected surface shape as disclosed in the aforementioned U.S. Pat. No. 3,738,785. A pressure producer is provided which is adjustable and controllable to a constant pressure and connected with the bearings of at least one of the rolls. The pressure is maintained constant through a controllable pressure producer such as disclosed in Reinhardt U.S. Pat. No. 3,738,785. The apparatus is characterized by the shafts of the rolls being disposed vertically one above the other and the open end of at least one feed screw is arranged in the gap of the rolls to feed the material substantially horizontally to the gap.

The rolls of the granulation apparatus in the arrangement of the invention have two functions. For the one, the powdery material should be compacted and, for the other, the air brought in with the powdery material should be removed via the porous filter roll.

The filter roll, for example, can be covered with sintered metal connected to a source of low pressure as in the aforementioned U.S. Pat. No. 3,738,785. In an advantageous construction of the invention the housing of the feed screw can be of sintered metal.

The process and the apparatus of the invention have the advantages that fluctuating powder densities are compensated for by changes of the speeds of the screw. Interference with the granulation sequence itself therefore is no longer necessary.

BRIEF DESCRIPTION OF THE DRAWING

The single FIGURE of the drawing is a side view, partially in section of an apparatus according to the invention.

DETAILED DESCRIPTION

The process and apparatus of the invention will be explained in more detail in connection with the drawing.

Powdery precipitated silica is added through the opening 1 into the funnel 2 and there stirred by means of the helically shaped stirrer 3. The stirrer 3 is driven via the gears 4 by the motor 5.

The stirred precipitated silica is fed through the funnel 2, into the horizontally disposed double conveyor screw 6. The double conveyor screw is driven via the gear 7 by the motor 8.

The precipitated silica is transported by means of the double conveyor screw 6 into the granulating apparatus 9 and is introduced into the gap between rolls 10 and 11. The rolls 10 and 11 are disposed horizontally in the housing of the granulation apparatus 9, whereby the shafts 12 and 13 of the two rolls 10 and 11 are spaced vertically with one above the other and extend parallel to one another.

The roll 10 includes a roll supporting structure on which is extended a roll cover (or jacket) made of sintered metal and the interior of which is connected to a vacuum source. The roll 11 has a profiled surface. The two rolls are moveable mounted, whereby an isodynamic applied pressure is produced by a hydraulic pressing device. The pressing device is diclosed in U.S. Pat. No. 3,738,785 FIG. 1.

In passing the gap between rolls 10 and 11 the powdery precipitated silica is deaerated and granulated. The granulated product then falls out of the granulating apparatus throught opening 14.

The following experiments were carried out with the silica VN3 and Sipernat 22 after vigorous fluidisation on the granulater rolls shown in the drawing.

During the experiments the gap between the rolls was widened from 3 mm to 5 mm and the product allotment into the feed to the screw aided by a stirrer in the supply container.

The test conditions and the test results are set forth in Table 1.

As a result of the experiments, it was established that the feeding by the screw converyor for forced conveying of VN3 and Sipernat 22 into the gap of the rolls can be carried out extremely effectively. The conveying and compacting capacity for the silica is not tied to a high product level in the gap of the rolls but it is extremely dependent on the type of product allotment in the feeding of the screw in the form of introduction aids such as, e.g., a stirrer having an open helix (Table 1, column 9).

The effect of the compacting forces occurring on the quality of the product appears to be negligible, since with VN3 no difference could be established between the starting material and the twice compacted product in the analytical values including the DPB-adsorption (dibutyl phthalate number) (Table 1 col. 15). The analytical values of silica Sipernat 22 shown an obvious shifting of the particular distribution into the fine range (Table 1, column 14), without the absorptive capacity, expressed in percent DBP adsorption, being damaged (Table 1, column 15).

The silica VN3 used is a precipitated silica. The silica Sipernat 22 used is a spray dried precipitated silica.

TABLE 1

| Product Data 1 | Granulator Roll Diameter mm 2 | Roll Length 3 | Roll gap mm 4 | RPM 5 | Screw Conveyor Screw Diameter mm 6 | RPM 7 | Current Consumption 8 | stirrer off – on + 9 | Conveyor Capacity kg/-h 10 |
|---|---|---|---|---|---|---|---|---|---|
| VN3 precipitated silica | — | — | — | — | — | — | — | — | — |
| VN 3 1 | 150 | 75 | 3 | 8 | 40 | 55 | 1,04 | + | 23 |
| VN 3 2 | 150 | 75 | 5 | 8 | 40 | 55 | 1,03 | + | 26 |
| Sipernat 22 Original | — | — | — | — | — | — | — | — | — |
| Sipernat 22 1 | 150 | 75 | 3 | 8 | 40 | 44 | 1,0 | – | 21 |
| Sipernat 22 2 | 150 | 75 | 3 | 8 | 40 | 55 | 1.03 | + | 28,5 |
| Sipernat 22 3 | 150 | 75 | 5 | 8 | 40 | 55 | 1,04 | + | 31 |

| Product Data 1 | Analytical Data Bulk Density g/l 11 | Tappet Density DIN g/l 12 | Sieve residue 63 μm g/l 13 | DBP-adsorption % 14 | Water Content % 15 | % 16 | Remarks 17 |
|---|---|---|---|---|---|---|---|
| VN3 precipitated silica | 205 | 133 | 217 | 4,9 | 231 | 7,6 | |
| VN 3 1 | 173 | 147 | 200 | 6,0 | 232 | 6,8 | Lumps not hard |
| VN 3 2 | 170 | 143 | 208 | 6,0 | 232 | 7,2 | Lumps not hard |
| Sipernat 22 Original | 226 | 213 | 294 | 76 | 265 | 5,4 | |
| Sipernat 22 1 | 226 | 213 | 294 | 75 | 765 | 5,4 | |
| Sipernat 22 2 | 200 | 166 | 227 | 50 | 267 | 5,5 | Lumps not hard |
| Sipernat 22 3 | 190 | 147 | 208 | 55 | 268 | 5,4 | Lumps not hard |

Col 11: Bulk density determined in 600 ml vessel, measurements: Diameter = 85 mm, h = 130 mm.
DIN = German Industrial Standard
DBP = Dibutylphthalate The entire disclosure of German priority application Pat. No. 3431865.8 ist hereby incorporated by reference.

What is claimed is:

1. A method of continuously processing a finely divided powdery material such as precipitated silica into a compressed form comprising:
    (a) feeding said powder through a stirrer;
    (b) conveying said stirred powder by means of at least one feed screw to a granulation station; and
    (c) compressing said powder at said granulation station by means of a pair of rollers; one of said rollers having an interior surface that is connected to a vacuum source and a porous exterior jacket that is made of sintered metal; said step of conveying including conveying said stirred powder to a point adjacent a gap defined between said pair of rollers.

2. An apparatus for processing finely divided, powdery material such as precipitated silica comprising:
    (a) a stirrer for mixing said powdery material;
    (b) at least one feed screw for conveying the stirred powdery material; and
    (c) a granulation station having a pair of rollers; one of said rollers having an interior surface that is connected to a vacuum source and a porous exterior jacket that is made of sintered metal; said feed screw and said granulation station being mounted so that said feed screw conveys the stirred powdery material to a point adjacent a gap defined between said pair of rollers.

3. The method as claimed in claim 1, wherein said step of conveying said stirred powder to a granulation station includes conveying said stirred powder generally horizontally to said granulation station.

4. A method of continuously processing finely divided, powdery precipitated silica into a compressed form comprising:
(a) feeding said precipitated silica through a stirrer;
(b) conveying said stirred precipitated silica by means of at least one feed screw to a granulation station; and
(c) compressing said precipitated silica at said granulation station by means of a pair of rollers; one of said rollers having an interior surface that is connected to a vacuum source and a porous exterior jacket that is made of sintered metal.

5. An apparatus as in claim 2 wherein said pair of rollers is mounted in a vertical plane and said feed screw is mounted so as to convey the stirred powdery material generally horizontally to said granulation station.

* * * * *